United States Patent [19]

Suzuki et al.

[11] Patent Number: 4,840,693

[45] Date of Patent: Jun. 20, 1989

[54] ORGANOPOLYSILOXANE HOT-MELT ADHESIVE

[75] Inventors: Toshio Suzuki; Tadashi Okawa, both of Chiba, Japan

[73] Assignee: Toray Silicone Co., Ltd., Tokyo, Japan

[21] Appl. No.: 221,694

[22] Filed: Jul. 20, 1988

[30] Foreign Application Priority Data

Jul. 23, 1987 [JP] Japan .................................. 62-183944

[51] Int. Cl.$^4$ .............................................. C09J 3/02
[52] U.S. Cl. ...................................... 156/329; 528/15; 528/31; 528/28
[58] Field of Search ................... 156/329; 528/15, 28, 528/31

[56] References Cited

U.S. PATENT DOCUMENTS 4,358,391 11/1982 Finkelmann et al. .................. 528/25
4,774,028 9/1988 Imai et al. ............................ 556/416

FOREIGN PATENT DOCUMENTS 23797 5/1987 Japan .

*Primary Examiner*—Melvyn I. Marquis
*Attorney, Agent, or Firm*—Susan M. Cornwall

[57] ABSTRACT

A hot-melt adhesive which has as its principal component an organopolysiloxane which converts to an isotropic liquid at temperatures of at least 40° C. and which contains the $R^1R^2SiO$ unit or $R^1R^2_2SiO_{\frac{1}{2}}$ unit, wherein $R^1$ is the —$R^3$—CN group, in which $R^3$ is a divalent organic group having at least one aromatic ring, and $R^2$ is an alkyl group having from 1 to 4 carbon atoms.

6 Claims, No Drawings

ORGANOPOLYSILOXANE HOT-MELT ADHESIVE

BACKGROUND OF THE INVENTION

1. Field of the Invention

The present invention relates to an organopolysiloxane hot-melt adhesive which melts as temperatures above room temperature to give a flowable liquid and which becomes a nonfluid upon cooling to room temperature, and which also can bond to material in contact with it during the cooling process.

Few thermoplastic organopolysiloxanes (nonflowable at room temperature, but rendered fluid by heating) are known in the art. Furthermore, the applicants are unaware of the prior existence of any organopolysiloxane-based hot-melt adhesives, which would have the ability to bond to material in contact with it during conversion from the fluid state to the nonfluid state cooling. While a hot-melt adhesive based on a silicon atom-containing non-organopolysiloxane polymer is known from Japanese Patent Publication No. 62-23797 [23,797/87], this hot-melt adhesive has a polyolefin backbone, and thus has poor heat resistance, cold resistance, ageing resistance, and water resistance.

SUMMARY OF THE INVENTION

The object of the present invention is to provide an organopolysiloxane-based hot-melt adhesive which has an excellent resistance to heat, cold, ageing, and water; which is nonfluid at room temperature, becomes a flowable liquid upon heating, and reverts to nonfluidity upon cooling; and which bonds well to materials in contact with it during the cooling process.

The object of the present invention can be achieved by using as the principal component of a hot-melt adhesive an organopolysiloxane which converts to the isotropic liquid at temperatures of at least 40 degrees Centigrade and which contains the $R^1R^2SiO$ unit or $R^1R^2{}_2SiO_{1/2}$ unit wherein $R^1$ is the $-R^3-CN$ group, in which $R^3$ is a divalent organic group having at least one aromatic ring, and $R^2$ is a lower alkyl group. The method of using the hot-melt adhesive to adhere a first substrate surface to a second substrate surface comprises:

(a) heating the hot-melt adhesive to at least 40° C.,
(b) coating the heated adhesive onto the first substrate surface,
(c) contacting the second substrate surface with the coated heated adhesive, and
(d) then allowing the coated adhesive to cool until the adhesive is in a nonfluid state.

DETAILED DESCRIPTION OF THE INVENTION

To explain this in greater detail, the hot-melt adhesive of the present invention is a hot-melt adhesive which has as its principal component organopolysiloxane which converts to the isotropic liquid at temperatures of at least 40 degrees Centigrade and which contains the $R^1R^2SiO$ unit or $R^1R^2{}_2SiO_{\frac{1}{2}}$ units. The structure of this organopolysiloxane can be linear, branched chain, cyclic, or network. In order to obtain temperatures for conversion to the isotropic liquid ($T_{iso}$ in the following) of approximately 50 to 200 degrees Centigrade, which is the optimal temperature range for practical applications, it is preferred that the structure of the organopolysiloxane be a linear chain or a slightly branched linear chain. In the sense of the present invention, $T_{iso}$ refers to that temperature at which the isotropic liquid, that is, the liquid lacking optical anisotropy, is finally obtained as the substance is heated and converted from the solid and through the liquid-crystalline state according to the particular case. $T_{iso}$ depends substantially on the organopolysiloxane's molecular weight and molecular structure and on the type and proportions of the organic substituent groups. While there is no specific restriction on the molecular weight of the organopolysiloxane, molecular weights of the at least 1,000 but not exceeding 100,000 are preferred in order to obtain good adhesion and an advantageous $T_{iso}$.

The $R^1R^2SiO$ unit or $R^1R^2{}_2SiO_{\frac{1}{2}}$ unit is the essential structural unit for imparting hot-melt adhesiveness to the organopolysiloxane, and at least one such unit must be present in each molecule of the organopolysiloxane. $R^1$ is the $-R^3-CN$ group, in which $R^3$ is a divalent organic group which contains at least one aromatic ring. This $R^3$ performs the important function of equipping the organopolysiloxane with hot-meltability, while the cyano group performs the important function of imparting adhesiveness. It is preferred that the cyano group be bonded directly to the aromatic ring, and it is also preferred that $R^3$ contains at least 2 aromatic rings. In addition, the aromatic ring is preferably bonded to the silicon atom through a suitable bridging group. Examples of these bridging groups are alkylene, alkyleneoxy, and alkyleneoxyalkyl groups. $R^3$ is exemplified as follows.

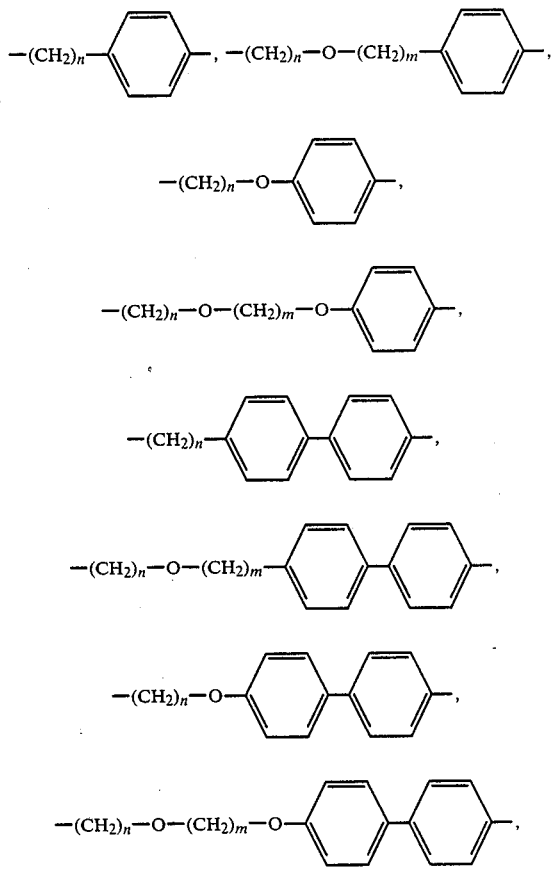

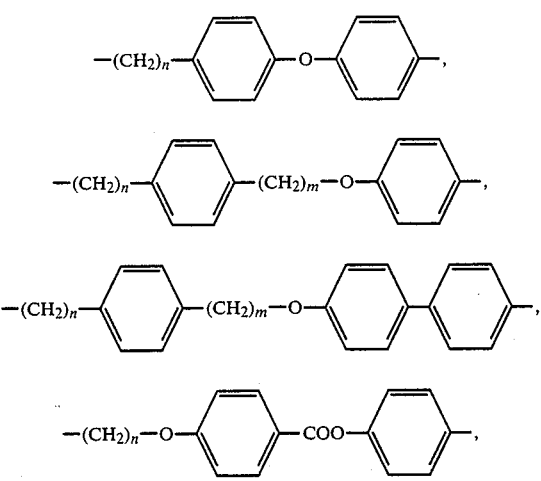

(In the preceding formulas, n and m are integers having values of at least one and no greater than 10.)

$R^2$ is a lower alkyl group, and is exemplified by methyl, ethyl, propyl, and butyl. Methyl is preferred based on economics and availability.

Each individual molecule of the organopolysiloxane must contain at least one $R^1R^2SiO$ unit or $R^1R^2{}_2SiO_{1/2}$ unit. In order to achieve a good hot-melt adhesion and $T_{iso}$, it is preferred that these units account for at least 30 mole % of the total constituent units, and even more preferably for at least 50 mole %.

Constituent units in the organopolysiloxane of the present invention other than the $R^1R^2SiO$ and $R^1R^2{}_2SiO_{1/2}$ units can be selected without restriction. From the standpoints of the hot-melt adhesiveness, economics, and ease of acquisition, one preferably selects dialkylsiloxane units, diarylsiloxane units, and alkylarylsiloxane units. The dimethylsiloxane unit, diphenylsiloxane unit, and methylphenylsiloxane unit are particularly preferred. Other than these units, triorganosiloxane units will be present at the molecular chain terminals of linear, branched chain, and network molecules, and monoorganosiloxane units will be present at the molecular branch points of branched molecules. Groups at defined by $R^1$ can be present in these triorganosiloxane and monoorganosiloxane units. In addition, silicon-bonded hydroxyl groups, hydrogen atoms, and alkoxy groups can also be present in small quantities.

The method for producing organopolysiloxane as specified in the present invention is not particularly restricted, and production can be carried out by methods known to the individual skilled in the art. For example, the organopolysiloxane can be obtained by the addition reaction between alkenyl groups and silicon-bonded hydrogen atoms by reacting SiH-containing polysiloxane in the presence of a platinum-type catalyst with a compound which simultaneously contains an alkenyl group, cyano group, and phenyl group. It is recommended in this case that the reaction be conducted in a solvent at room temperature or with heating. The following solvents are recommended: aromatic solvents such as benzene, toluene, and xylene; aliphatic solvents such as hexane and heptane; ethers such at tetrahydrofuran and diethyl ether; alcohols such as methanol, ethanol, propanol, and butanol; ketones such as acetone and methyl ethyl ketone; esters such as ethyl acetate and butyl acetate; chlorinated hydrocarbons such as carbon tetrachloride, trichloroethane, and chloroform; and dimethylformamide and dimethyl sulfoxide. Combinations of two or more of these solvents are also suitable.

In addition to organopolysiloxane which contains the $R^1R^2SiO$ unit or $R^1R^2{}_2SiO_{1/2}$ unit and which converts to the isotropic liquid at temperatures of at least 40 degrees Centigrade, the hot-melt adhesive of the present invention can contain a variety of additives. The following are provided as examples: inorganic fillers such as fumed silica, precipitated silica, fused silica, powdered quartz, silica gel, silica balloons, carbon black, mica, talc, calcium carbonate, glass fibers, iron oxide, titanium oxide, alumina, aluminum hydroxide, and diatomaceous earth; oils such as silicone oils, mineral oils, and hydrocarbon oils; pigments; dyes; antioxidants; heat stabilizers; and flame retardants.

The hot-melt adhesive of the present invention can be used by the same methods as for conventional hot-melt adhesives. Thus, the hot-melt adhesive in its nonfluid state at room temperature is heated to at least $T_{iso}$ while pressed against the adherend and is then cooled to room temperature to generate the bond. Alternatively, the hot-melt adhesive is made fluid by heating to at least $T_{iso}$ and is then coated on the adherend and cooled to room temperature to obtain bonding.

The hot-melt adhesive of the present invention can be used in those applications which use conventional hot-melt adhesives. In particular, it is useful as a hot-melt adhesive for metals, glasses, ceramics, plastics, films, fabrics, and paper in the following sectors: electrical/electronics, mechanical, automotive, construction, plastics processing, textile, and bookbinding.

EXAMPLES

The present invention will be explained with reference to the following illustrative examples, in which all parts and percentages are by weight and the viscosities were measured at 25 degrees Centigrade.

EXAMPLE 1

15 parts trimethylsiloxy-terminated polymethylhydrogensiloxane having a viscosity of 30 centistokes, 400 parts toluene, and 0.3 parts isopropanolic chloroplatinic acid solution (2%) were placed in a four-neck flask. 55.3 parts p,p'-allyloxycyanobiphenyl were added while heating to 70 degrees Centigrade. After heating under reflux for 6 hours, disappearance of the silicon-bonded hydrogen atoms was confirmed by infrared spectroscopy (IR) and nuclear magnetic resonance (NMR). The reaction solution was filtered and the toluene and unreacted material were removed by distillation under vacuum. The residue was confirmed by NMR to be trimethylsiloxy-terminated polymethyl(p,p'-cyanodiphenyloxypropyl)siloxane (AP-1). AP-1 had a $T_{iso}$ of 160 degrees Centigrade, and it was a film-formable plastic-like solid at room temperature. AP-1 was melted by heating to 170 degrees Centigrade, and the AP-1 melt was coated on a stainless steel plate, which caused its immediate solidification. After 10 minutes, a knife was used to peel the AP-1 from the stainless steel plate; however, it was strongly bonded and could not be completely peeled.

In the comparison example, the same experiment as above was carried out using 49.2 parts p-allyloxybiphenyl in place of the 55.3 parts p,p'-allyloxycyanobiphenyl. This product did not bond to the stainless steel plate at all, and the film was easily peeled off by rubbing with the fingers.

EXAMPLE 2

15 Parts trimethylsiloxy-terminated polymethylhydrogensiloxane having a viscosity of 30 centistokes, 100 parts toluene, and 0.3 parts isopropanolic chloroplatinic acid solution (2%) were placed in a four-neck flask. 36 Parts p-vinylbenzyl chloride was dripped in while heating to 70 degrees Centigrade. After the completion of addition and heating under reflux for an additional 6 hours, the disappearance of the silicon-bonded hydrogen atoms was confirmed by IR and NMR. After filtering the reaction solution, the toluene and unreacted material were removed by distillation under vacuum. The residue was identified by NMR as trimethylsiloxy-terminated polymethyl(p-chloromethylphenylethyl)-siloxane (CP-1).

167 Parts of a 10% ethanol solution of the sodium salt of p,p'-cyanophenylphenol, 200 parts toluene, and 15.8 parts CP-1 were placed in a four-neck flask and heated under reflux for 20 hours. After the addition of dilute aqueous hydrochloric acid until the reaction solution in the flask became weakly acidic, the solvent was removed by distillation under vacuum. The residue was dissolved in chloroform, this was washed with water, and the chloroform was removed by evaporation to afford a light brown solid with a $T_{iso}$ of 140 degrees Centigrade. This solid polymer, designated as AP-2, was determined by analysis to be CP-1 in which all chlorine atoms were replaced by cyanodiphenyloxy groups. AP-2 was placed on a glass plate, and the glass plate was heated to 160 degrees Centigrade in order to melt the AP-2. After standing at room temperature for one hour, the AP-2 was peeled from the glass plate using a knife: it could not be completely removed.

In the comparison example, the same experiment as above was conducted using 148 parts of a 10% ethanol solution of the sodium salt of p-phenylphenol in place of the 167 parts 10% ethanol solution of the sodium salt of p,p'-cyanophenylphenol. This polymer did not adhere to the glass plate at all and peeled spontaneously.

EXAMPLE 3

20 Parts tetrakis(dimethylhydrogensiloxy)silane, 80 parts toluene, and 0.2 parts isopropanolic chloroplatinic acid solution (2%) were place in a four-neck flask and heated to 70 degrees Centigrade. 74 Parts of a 50% toluene solution of vinylbenzyl chloride was then dripped in from an addition funnel. After the completion of addition, heating under reflux was conducted for 6 hours. Analysis of the reaction solution by NMR confirmed the disappearance of the silicon-bonded hydrogen atoms. The reaction solution was filtered, and the solvent and unreacted material was removed by distillation under vacuum. Analysis of the residue (CP-2) identified it as a polysiloxane with the following formula.

Si [OSi(CH$_3$)$_2$ - R]$_4$ where R=

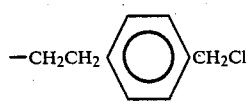

15 Parts p,p'-cyanophenylphenol, 100 parts ethanol, and 3.1 parts microgranular sodium hydroxide were placed in a four-neck flask, followed by heating with stirring until complete dissolution of the sodium hydroxide. 17.1 Parts CP-2 and 200 parts toluene were then added, followed by heating under reflux for 18 hours. After the addition of dilute aqueous hydrochloric acid until the reaction solution became weakly acidic, the solvent was removed by distillation under vacuum. The residue was dissolved in chloroform. After washing with water, evaporation of the chloroform afforded a white candy-like material having a $T_{iso}$ of 136 degrees Centigrade. Analysis of this candy-like polymer (AP-3) identified it as CP-2 in which all the chlorine atoms had been replaced with the cyanodiphenyloxy group. The AP-3 was inserted between aluminum plates, which were then bonded together by heating to 150 degrees Centigrade and standing at room temperature for 30 minutes. Measurement of the tensile strength of this adhesion specimen gave a value of 550 g/cm2.

In the comparison example, the same experiment as above was carried out using 13.2 parts p-phenylphenol in place of the 15 parts p,p'-cyanophenylphenol. This product did not adhere to the aluminum plates at all, and tensile testing thus could not be carried out.

Since the hot-melt adhesive of the present invention has as its principal component an organopolysiloxane which becomes an isotropic liquid at temperatures of at least 40 degrees Centigrade and which contains the $R^1R^2SiO$ unit or $R^1R^2_2SiO_{1/2}$ unit wherein $R^1$ is the —$R^3$—CN group, in which $R^3$ is a divalent organic group containing at least one aromatic ring, and $R^2$ is a lower alkyl group, it melts at temperatures above room temperature to afford a flowable liquid, becomes a non-fluid upon cooling to room temperature, and adheres to materials in contact with it during the cooling process. Furthermore, it has an excellent heat resistance, cold resistance, weather resistance, and water resistance.

That which is claimed is:

1. A method of adhering a first substrate surface to a second substrate surface comprising the steps of:
    (a) heating to at least 40° C. a material which comprises predominantly an organopolysiloxane which converts to an isotropic liquid at temperatures of at least 40° C. and which contains the $R^1R^2SiO$ unit or $R^1R^2_2SiO_{1/2}$ unit, wherein $R^1$ is the —$R^3$—CN group, in which $R^3$ is a divalent organic group having at least one aromatic ring, and $R^2$ is an alkyl group having from 1 to 4 carbon atoms,
    (b) coating said heated material onto said first substrate surface,
    (c) contacting said second substrate surface with said coated heated material, and
    (d) then allowing said coated material to cool until said material is in a nonfluid state.

2. A method as claimed in claim 1 wherein $R^1$ is an organic group containing the cyanobiphenyl group and $R^2$ is the methyl group.

3. A method as claimed in claim 1 wherein at least 50 mole % of the organopolysiloxane units are $R^1R^2SiO$ units or $R^1R^2_2SiO_{1/2}$ units.

4. A method as claimed in claim 1 wherein said organopolysiloxane has a molecular weight between 1,000 and 100,000.

5. A method as claimed in claim 1 wherein the cyano group is bonded directly to said aromatic ring.

6. A method as claimed in claim 1 wherein $R^3$ contains at least 2 aromatic rings.

* * * * *